Aug. 22, 1967     E. S. WIESZECK     3,337,286
AUTOMATICALLY CONTROLLED TRANSLUCENT
SCREEN FOR A REAR VIEW MIRROR
Filed Feb. 21, 1964     3 Sheets-Sheet 1

INVENTOR:
EMIL S. WIESZECK
BY
Dawson, Tilton, Fallon, Lungmuss & Alexander
ATTORNEYS Aug. 22, 1967  E. S. WIESZECK  3,337,286
AUTOMATICALLY CONTROLLED TRANSLUCENT
SCREEN FOR A REAR VIEW MIRROR
Filed Feb. 21, 1964 3 Sheets-Sheet 2

INVENTOR:
EMIL S. WIESZECK
BY
Dawson, Tilton, Fallon, Lungmus & Alexander
ATTORNEYS

United States Patent Office 3,337,286
Patented Aug. 22, 1967

3,337,286
AUTOMATICALLY CONTROLLED TRANSLUCENT
SCREEN FOR A REAR VIEW MIRROR
Emil S. Wieszeck, Box 175, Salem, N.H. 03079
Filed Feb. 21, 1964, Ser. No. 347,076
2 Claims. (Cl. 350—283)

This application is a continuation-in-part of my copending application, Ser. No. 170,418, filed Feb. 1, 1962, now abandoned.

This invention relates to an automobile reflecting system, and, more particularly, to a device for selectively reducing the glare of light incident on a rear view mirror.

A hazard of night driving on the highways is the frequent reflection into the eyes of a driver of unexpectedly brilliant light from vehicle headlights picked up in the rear view mirror. In many instances, the sudden blinding effect of such light glare occurs at a time when the driver may well wish to have all of his attention directed to operating the car and watching the road, so that there is not a suitable opportunity to manually adjust the rear view mirror and turn away the glaring light. The avoidance of this hazard constitutes an important object of the invention.

Although glare-reducing devices of various types and for various purposes have been employed for a considerable period, they have presented a number of problems, among which are included an undesirable complexity if in any way automatic, and also that they usually have some critical operating level. By the latter is meant a state of operation wherein the responding element is unstable, as might be characterized by "stuttering." These problems are avoided in the instant invention, and the provision of apparatus for the solution of these problems constitutes another object of this invention.

Still another object of this invention is to provide a compact, operationally stable glare-reducing device for a rear view mirror, or the like, in which a light-responsive element is positioned on the side of a translucent mirror remote from the source of incident light.

Yet another object of the invention is to provide a novel glare-reducing apparatus for an automobile rear view mirror, or the like, in which the incident light is attenuated relative to the driver by twice passing through a glare shield but only once attenuated by the glare shield in impinging upon a translucent mirror equipped with a light-sensitive device.

Other objects and advantages of the invention may be seen in the details of construction and operation set down in this specification.

The invention will be explained in conjunction with the accompanying drawing, in which.

Figure 3:
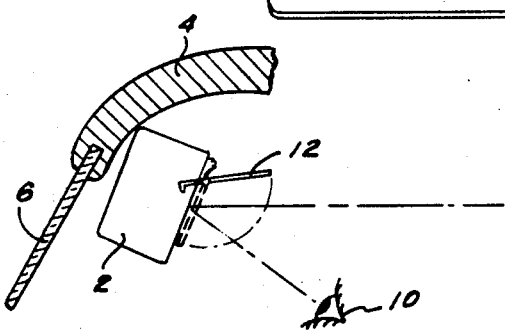
FIG. 3 is a detail view suggesting a typical operative position of the glare control member wherein the glare shield is raised and ready to be lowered across the mirror member.

Referring more in detail to the drawing, the numeral 2 denotes a small enclosure body which may be formed of plastic, metal and other desirable material and which is of a size adapted to be secured against the inner surface of the top 4 of an automobile body just above the windshield 6, for example, as suggested in FIG. 3.

Mounted at one side of the member 2 in a suitable frame is a rear view mirror 8 which may be of a conventional shape and size and which is adapted to provide to the eyes of a driver a view of vehicles approaching from the rear. It is contemplated that an ordinary rear view mirror used in day driving may be employed rather than a type of mirror having dimming characteristics so as to maintain the highest possible level of visibility during night driving conditions when glare is not present. In one desirable form, the mirror may consist of a coated glass so processed that a desired portion of incident light may pass through the mirror and the balance will be reflected.

Figure 1:
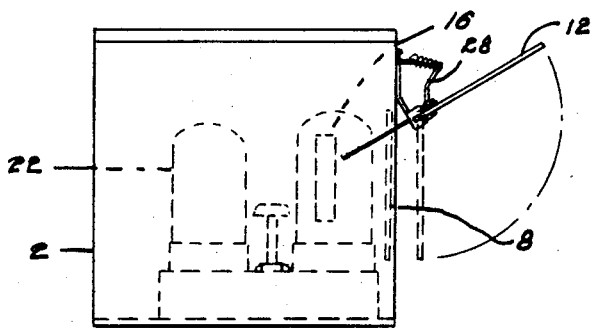
FIG. 1 is a side elevational view of the glare control unit of the invention.

In accordance with the invention, I combine with the mirror 8 and enclosure body 2 a glare shield 12 which is adapted to be pivotally supported on the enclosure body 2 at some convenient point in a position just above the mirror 8 as illustrated in FIGS. 1 and 3. The glare shield 12 is formed of a transparent material and is preferably colored to provide a suitable density which will absorb an amount of light rays reflected from mirror 8 to prevent undesirable brilliance or glare.

Figure 2:
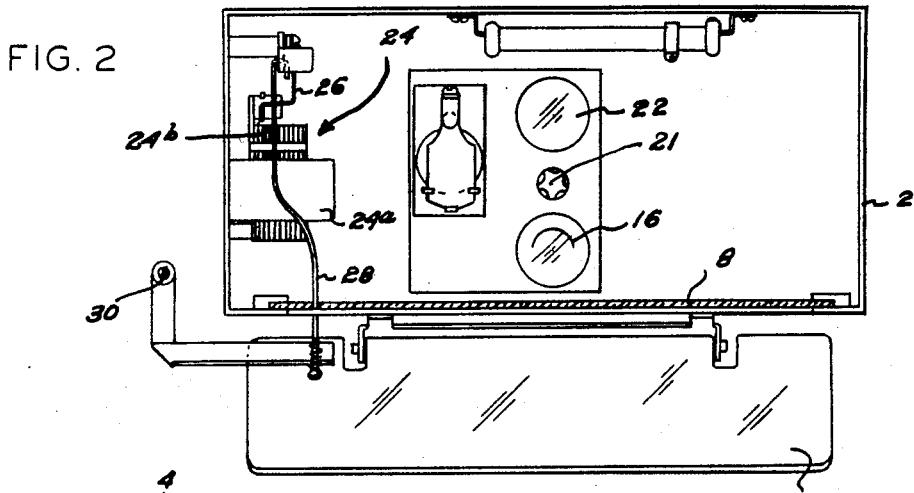
FIG. 2 is a plan view showing the various components of the glare control unit.
Figure 5:
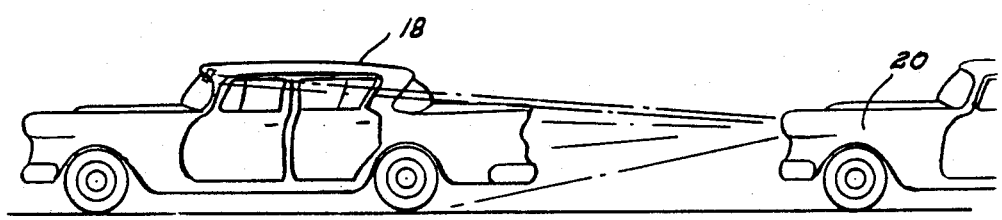
FIG. 5 is a diagrammatic view indicating light from the headlights of one car directed towards the anti-glare device of the invention installed in another car.

I further combine with the glare shield 12 actuating means for pivoting the shield into and out of a protective position in front of the mirror 8 in response to a sudden increase in intensity or brilliance of light, for example, coming from headlights of a vehicle approaching from the rear. As shown in FIGS. 1 and 2, I mount on a suitable base in the member 2, a photoelectric cell 16. This component is located directly in back of the mirror 8 in a position to lie in the path of light rays entering the rear of a car 18 from the headlights of a second car 20, as shown in FIG. 5.

Thus any glare or excessive brilliance of light rays striking the mirror will instantly produce a change in the output of the photoelectric cell 16. This output causes a solenoid generally indicated by the arrow 24 to become actuated. It is possible to actuate the member 24 directly without any amplification of the output from the photoelectric cell 16. However, I may prefer to use an amplifier 22 to provide a greater range of power and control.

Figure 6:
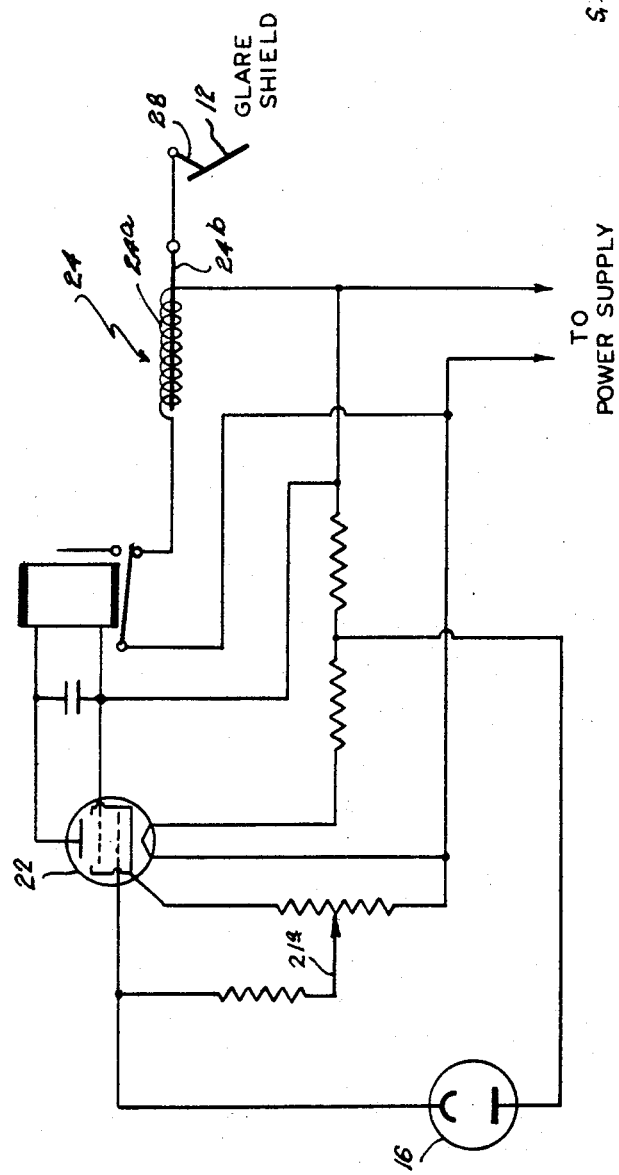
FIG. 6 is a wiring diagram illustrating electrical components of the invention.

As illustrated more in detail in the wiring diagram of FIG. 6, the output from the photoelectric cell 16 is conducted to the control grid of the tube 22 and the amplified power is then employed to energize the solenoid 24 which includes a coil 24a and a plunger 24b.

This latter member may, for example, be operatively connected to a bell crank lever arrangement 26 which, as shown in detail in FIG. 2, may operate a spring-held rod 28. The rod 28 is normally held in the raised position as shown in full lines in FIG. 1. However, when the solenoid is energized, the glare shield 12 is lowered into the dotted line position suggested in FIG. 1 directly in front of the mirror 8, and dimming or shielding takes place in a very short interval of time. By forming the glare shield 12 of suitable density or opacity, I am enabled to control the period during which the shield will remain in a protective position and yet will instantly move back into a non-operative position when the level of light intensity drops below a predetermined point. In this way, a very precise control of the shield may be realized and the danger of sustained glare temporarily blinding a driver can be almost entirely eliminated. In other words, there is a quick reaction of the system to glaring headlights approaching from the rear so as to intersperse the glare shield or screen between the driver's eyes and the rear view mirror. However, the intensity at which the shield or screen is retracted is considerably lowered, and thereby provides a safeguard for the driver's vision.

For example, in one preferred form, the mirror shield 12 may be arranged to operate in a differential range of 30 to 40 foot-candles. This differential may be adjusted to a differential of 20 to 50 foot-candles by switching to different capacity condensers with selector switch $S_1$ to any one of a desired number of condensers $C_1$, $C_2$, $C_3$, etc., the differing condensers each providing a different differential and arranged to be in increasing order from, say $C_1$ on through the series. In the first instance, the shield 12 would drop down at 40 ft.-c. and not rise until the light inensity decreased to 30 ft.-c., and similarly in the second instance with a differing differential. The number 21 denotes a knob attached to a rheostat 21a for varying the response of the glare shield to a desired range of light intensity, i.e., setting the operating range, as in the first instance, to, say, a differential of 50–60 ft.-c. from the original setting of 30–40 ft.-c.

Figure 4:
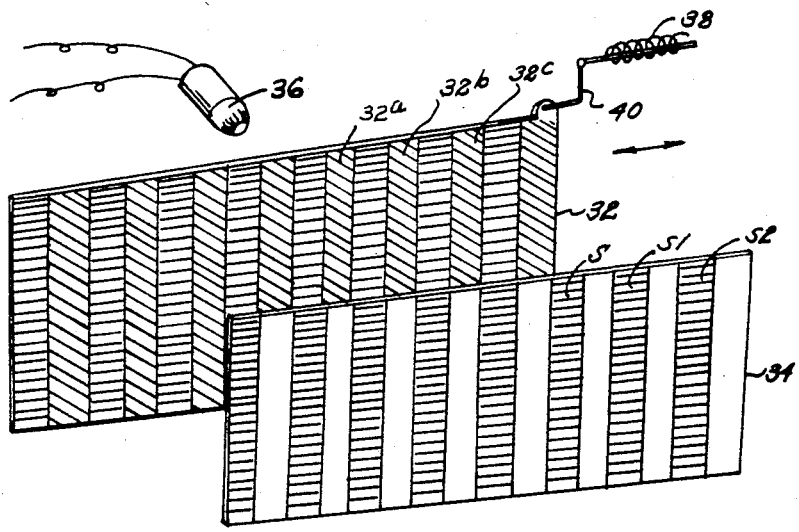
FIG. 4 is a perspective detail view illustrating a pair of cooperating glare shield members constituting a modified form of the invention.

In FIG. 4, I have illustrated a dual shield arrangement consisting of shield members 32 and 34. An important feature of this dual shield arrangement is the particular construction of the members 32 and 34. These members consist of two thin plastic sheets, one of which is highly translucent, namely, the sheet 34, and the other of which is shaded so that it retards transmission of light. The sheets may also be of glass or other suitable material. On sheet 34 are located strips of light-reflecting material S, S1, S2, etc., which are arranged in spaced-apart relation as shown in FIG. 4. Also on sheet 32 are light-reflecting strips 32a, 32b, 32c, etc., likewise spaced apart from one another. Since the front sheet 34 is of clear plastic highly translucent in nature, light impinges thereon and tends to pass through the clear portion of the sheet lying between the strips and other light will be reflected from the strips S, S1, S2, etc., which optimally may be of the order of $\frac{1}{16}$" in width.

In normal configuration, the mirror strips of the rear plastic are positioned to coincide with the clear sections of the forward plastic, presenting an ostensibly solid mirror to a viewer some 24" away as in normal automobile mirror mounting positions. Since the mirror strips are extremely thin and pass approximately 30% of the incident light, a brilliant source of light such as an automobile pair of headlights approaching from behind would actuate the tiny photocell 36 I place behind this mirror complex. I attach the inner mirror to the arm of a relay so that the bright lights would cause the rear plastic to move a minute amount along its horizontal axis or vertical axis, as the case may be, for the particular mirror design, and remove about half of the mirror surface and accordingly reduce the intensity of the reflected light to the driver. Upon removal of the source of light from the mirror complex, the rear mirror returns to its normal position, affording maximum reflection of light to the driver—at an obviously safe level.

I may also provide a further compensation to this device by tinting the mirror of the forward plastic slightly blue. The object of this is to provide the eye with the illusion of a perfectly smooth mirror surface, rather than one with adjacent mirror surfaces not in the same plane. I have observed that at night, a sign seen a distance of some 700 feet, for example, with red and blue neon glow letters, tends to give the illusion that the red letters are located well in front of the blue letters. In fact, the red letters appear to be in a normal position, while the blue ones seem to be in back of the red letters.

Therefore, by leaving the rear mirror reflective strips white or shading them in the yellowish red color regions, I find I may create the illusion of the forward strips being more rearwardly disposed than they are—the coloration being subtle and merely a tint, so that at normal distances no appreciable differences can be detected in the mirror by the human eye.

The flexibility of operation of the above-described system is particularly advantageous when it is considered that headlights decrease in intensity with age. It may be that a new pair of headlights throw out a total of 150,000 foot-candles of illumination, which, at 40 feet, could mean approximately 90 foot-candles striking the rear view mirror, depending upon atmospheric conditions, snow, rain, etc. Observation leads me to believe that illumination at the mirror of 30 foot-candles or more is objectionable, again depending upon the sensitivity of the viewer's eyes, so that it may be desirable in some instances to make the lowest setting sensitive to such an illumination. This can be achieved through the arrangement of FIG. 7, where several condensers are arranged in parallel for selective interconnection across the relay. In one embodiment, the condensers were 4 microfarad, 8 mfd. and 20 mfd., all rated at 450 volts.

Alternatively, it will be appreciated that hysteresis may be introduced into the system mechanically, as by allowing the weight 30 in FIG. 2 to be free to swing about 15 angular degrees on either side of the mirror frame, so that in a down position a greater moment would exist to be overcome by the solenoid than if the weight were a perfect fixed counterbalance to the mirror shield.

Figure 7:
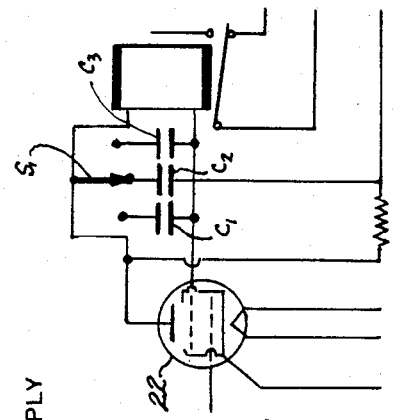
FIG. 7 is a fragmentary schematic diagram showing a modification to FIG. 6.

It will be seen that the light-responsive means, i.e., the photocell 16, is positioned behind the mirror 8 and in the path of light rays attenuated by passing through the partially reflecting mirror. The photocell and its associated circuitry are arranged to respond to any light signal above a first threshold to position the shield or screen 12 in front of the mirror 8. The invention also includes providing a second and lower threshold for retraction of the screen 12. This takes the form of a time delay mechanism or RC circuit, as illustrated, in the electromechanical circuit. Thus I avoid having the covering device hunt and cycle as the shield 12 lowers the light intensity below the response threshold, resulting in retraction—after which the impingement of the more intense rays (by virtue of the absence of the shield) would again actuate the covering mechanism. A variation of the time constant of the RC circuit may be achieved either through a plurality of condensers such as is shown in FIG. 7, or, alternatively, a variable resistance.

While in the foregoing specification I have set down a detailed description of the invention for the purpose of explanation thereof, many variations in the details thereof herein given may be made by those skilled in the art without departing from the spirit and scope of the invention.

I claim:

1. An automobile reflecting system, comprising a partially reflecting surface positioned within the automobile for driver view of objects positioned rearwardly thereof, a translucent screen mounted adjacent said surface for selective movement in covering relation with said surface so as to be interposed between the said surface and the driver's eyes, and means including a light responsive element behind said surface for selectively moving said screen, said surface thereby necessarily attenuating the light incident on said element and said screen being interposable in the path of light incident on said element when said screen is in covering relation with said surface, and means operatively associated with said element for delaying the return of said screen to uncovered relation relative to said surface, said delaying means including electrical mechanical means and capacitance means for developing an RC circuit.

2. An utomobile reflecting system, comprising a partially reflecting surface positioned within the automobile for driver view of objects positioned rearwardly thereof, a translucent screen mounted adjacent said surface for selective movement in covering relation with said surface so as to be interposed between the said surface and the driver's eyes, and means including a light responsive element behind said surface for selectively moving said screen, said surface thereby necessarily attenuating the light incident on said element and said screen being interposable in the path of light incident on said element when said screen is in covering relation with said surface, and means operatively associated with said element for delaying the return of said screen to uncovered relation relative to said surface, said delaying means including electrical mechanical means and capacitance means for developing an RC circuit, said capacitance means including a plurality of capacitors for varying the time constant of said RC circuit, said electromechanical means including a relay and switch selectively coupleable to one of said capacitors.

References Cited

UNITED STATES PATENTS

| | | | |
|---|---|---|---|
| 1,668,160 | 5/1928 | Lingner | 88—77 |
| 2,311,400 | 2/1943 | Landell | 88—77 |
| 2,960,636 | 11/1960 | Fitzpatrick | 317—141 |
| 3,000,262 | 7/1961 | Rabinow et al. | 88—77 |
| 3,075,430 | 1/1963 | Woodward et al. | 88—77 |

FOREIGN PATENTS

| | | |
|---|---|---|
| 489,442 | 7/1938 | Great Britain. |

JEWELL H. PEDERSEN, *Primary Examiner.*

JOHN K. CORBIN *Examiner.*